United States Patent
Guter et al.

(10) Patent No.: US 7,465,400 B2
(45) Date of Patent: *Dec. 16, 2008

(54) SYSTEM FOR BIODEGRADATION OF OXYANIONS SUCH AS PERCHLORATE ON ION EXCHANGE RESINS

(75) Inventors: Gerald A. Guter, deceased, late of San Clemente CA (US); by Janet A. Solomon, legal representative, San Clemente, CA (US); Byung-Uk Bae, Daejon (KR)

(73) Assignee: Basin Water, Inc., Rancho Cucamonga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/949,514

(22) Filed: Dec. 3, 2007

(65) Prior Publication Data
US 2008/0073275 A1 Mar. 27, 2008

Related U.S. Application Data

(62) Division of application No. 10/789,432, filed on Feb. 26, 2004, now Pat. No. 7,311,843.

(60) Provisional application No. 60/484,949, filed on Jul. 2, 2003.

(51) Int. Cl.
*C02F 3/00* (2006.01)
(52) U.S. Cl. .................. 210/670; 210/674; 210/681
(58) Field of Classification Search .......... 210/670, 210/674, 681
See application file for complete search history.

(56) References Cited

U.S. PATENT DOCUMENTS

| | | | |
|---|---|---|---|
| 3,755,156 | A | 8/1973 | Yakovlev et al. |
| 5,302,285 | A | 4/1994 | Attaway et al. |
| 6,066,257 | A | 5/2000 | Venkatesh et al. |
| 6,077,432 | A | 6/2000 | Coppola et al. |
| 6,358,396 | B1 | 3/2002 | Gu et al. |
| 6,407,143 | B1 | 6/2002 | Even et al. |
| 6,423,533 | B1 | 7/2002 | Geartheart et al. |
| 7,311,843 | B2 * | 12/2007 | Guter et al. .................. 210/670 |
| 2002/0132866 | A1 | 9/2002 | Even et al. |
| 2003/0222031 | A1 | 12/2003 | Gu et al. |

FOREIGN PATENT DOCUMENTS

DE 199 34 409 1/2001

OTHER PUBLICATIONS

Rikken et al., "Transformation of (per)chlorate into chloride by a newly isolate bacterium: reduction and dismutation," Appl. Microbial. Biotechnol 45:420-426 (1996).

(Continued)

*Primary Examiner*—Chester T Barry
(74) *Attorney, Agent, or Firm*—Foley & Lardner LLP

(57) ABSTRACT

Systems and methods for removing perchlorate load off of ion exchange resins are disclosed. The systems and methods rely upon direct contact between the resin and a liquid product formed by the culturing of perchlorate-destroying microorganisms. These methods can be incorporated into methods for removing perchlorate from aqueous streams. A resin product comprising an anion exchange resin with a coating of perchlorate-destroying microorganisms on its surface is also disclosed.

26 Claims, 3 Drawing Sheets

OTHER PUBLICATIONS

Gingras et al., "Biological reduction of perchlorate in ion exchange regenerant solutions containing high salinity and ammonium levels," J. Environ. Monit. 4:96-101 (2002).

Bruce et al., "Reduction of (per)chlorate by a novel organism isolated form paper mill waste," Environ Microbial 1(4):319-329 (1999).

Logan, et al., "Kinetics of Perchlorate-and-Chlorate-Respiring Bacteria," Appl. Environ. Microbial 67(6):2499-2506 (2001).

Logan, B. E., "Assessing the outlook for perchlorate remediation," Environmental Science & Technology 35:23 (2001).

Xu et al., "Microbial Degradation of Perchlorate: Principles and Applications," Env. Engineer. Science 20:405-422 (2003).

* cited by examiner

SYSTEM FOR BIODEGRADATION OF OXYANIONS SUCH AS PERCHLORATE ON ION EXCHANGE RESINS

REFERENCE TO RELATED APPLICATIONS

This application claims priority to U.S. Provisional Patent Application Ser. No. 60/484,949, filed on Jul. 2, 2003 and is a divisional of U.S. Patent Application Ser. No. 10/789,432, filed on Feb. 26, 2004 both of which are incorporated herein by reference.

BACKGROUND OF THE INVENTION

1. Field of the Invention

This invention pertains to the field of water treatment and to the use of ion (anion) exchange resins to remove contaminants such as perchlorate ions from aqueous feed stocks ranging from domestic, industrial and agricultural water supplies such as drinking water to brines and other aqueous streams. More particularly, this invention relates to the removal of perchlorate load from perchlorate-loaded resins loaded by use in water treatment so as to permit reuse or safe disposal of the resin.

2. Background Information

Ammonium perchlorate has been used for the past 50 years as an oxidizer component in solid explosives and solid propellants for rockets, missiles and fireworks. It is estimated that well over 90% of the ammonium perchlorate produced in the United States is used in these applications. Casual handling of perchlorates and perchlorate-laden effluents by manufacturers, and the build up of poorly-contained stockpiles of outdated missile and rocket fuels have resulted in perchlorate contamination of surface water and ground water supplies. Perchlorate contamination is a growing problem in at least 14 Western states in the United States and has been reported in Europe as well.

The California Department of Health Services has established an action level for perchlorate of 18 ug/l. This is based upon the potential for perchlorate to inhibit the uptake of iodine by the thyroid gland. Perchlorate levels of up to several hundred ug/l have been found in ground water in California and other states.

Two approaches to removing perchlorate from water supplies are being researched extensively—biological destruction and ion exchange. Biological destruction using various bacterial strains has been described at the Federal Remediation Technologies Roundtable General Meeting held on May 30, 2001 where Jeffrey Marqusee described how biological organisms could attack perchlorate in subsurface environments. Similar studies were also reported at that meeting by Paul Hatzinger (Poster Number 43) and by John D. Coates (Poster Cleanup CU 45).

Ion exchange is attractive because perchlorate has a very high affinity for common polystyrene-based strong base anion exchange resins. However, state of the art practice does not provide a practical and convenient method for regeneration of the resin. This is due at least in part to perchlorate's affinity for the common resins being so strong that very large quantities of concentrated sodium chloride brine are required to displace the perchlorate during regeneration. Several hundred pounds of sodium chloride regenerant per cubic foot of resin at salt concentrations of from 6% to saturation are typically used. Alternatively, the resins can be used once for perchlorate adsorption and then thrown away instead of being regenerated. In both cases, a difficult-to-deal-with perchlorate-loaded end product is formed. The loaded resin can not be safely discarded in ordinary land fills and the like because of fears of its perchlorate content reentering the environment. Attempts to bacterially break down the perchlorate content of the concentrated sodium chloride brine have been unsuccessful because the bacteria are generally inactivated by the high salt levels. For example, Tina M. Gingras and Jacimaria R. Batista reported in *J. Environ. Monit.* (2002), 4, 96-101, that as little as 0.5% sodium chloride present in a bioremediation environment lowered perchlorate degradation activity by 30% while 1.0% sodium chloride reduced activity by 60%.

What is needed, and what this invention provides, is a process for removing perchlorate from perchlorate-loaded ion exchange resins without generating large quantities of intractable regeneration products. This invention also provides a new form of ion exchange resin which is capable of removing perchlorate ions from solution and directly breaking the perchlorate down to nonperchlorate species in situ.

STATEMENT OF THE INVENTION

It has now been found that the perchlorate load present on a perchlorate-loaded ion exchange resin can be reduced, and in some cases virtually completely eliminated, by contacting the loaded resin in situ with a perchlorate-destroying microorganism fluid product. This perchlorate-destroying microorganism fluid product can be a suspension of cultured perchlorate-destroying microorganism. It also can be a supernatant obtained from such a suspension.

Thus, in one overall aspect, this invention provides a method for reducing the level of perchlorate load on perchlorate-loaded ion exchange resin. This general method includes the steps of obtaining perchlorate-loaded ion exchange resin, and directly contacting the perchlorate-loaded ion exchange resin with a perchlorate-destroying microorganism fluid product under conditions leading to conversion of the perchlorate load on the resin to nonperchlorate reaction products. These conditions are most commonly referred to as facultative or anaerobic conditions. The nonperchlorate reaction products include one or more of chlorate, chlorite, hypochlorite and chloride. This gives rise to a treated ion exchange resin having reduced perchlorate load relative to the perchlorate-loaded ion exchange resin.

This advantageous process can be used in a variety of settings including not only settings in which the treated ion exchange resin is recovered and recycled for reuse but also settings in which the treated ion exchange resin is more safely disposed of by reason of its reduced perchlorate load.

Therefore, in another aspect, this invention can be embodied as a method for regenerating perchlorate-loaded ion exchange resin. This method involves first obtaining perchlorate-loaded ion exchange resin from a water treatment zone. This is a zone in which the resin is used to remove perchlorate from a perchlorate-contaminated water stream and thus to reduce the perchlorate level in that water stream. This perchlorate-loaded resin is then directly contacted with a perchlorate-destroying microorganism fluid product under conditions leading to conversion of perchlorate load on the resin to nonperchlorate reaction products and generation of a treated ion exchange resin having reduced perchlorate load relative to the perchlorate-loaded ion exchange resin. These conditions and reaction products were described earlier. The treated resin is recovered and typically, after rinsing and other suitable steps, is recycled to a water treatment zone for further use removing perchlorate from a perchlorate-contaminated water stream.

In another aspect this invention can be embodied as a method for safely disposing of perchlorate-loaded ion exchange resin This embodiment involves obtaining perchlorate-loaded ion exchange resin, and, prior to disposal, directly contacting the perchlorate-loaded ion exchange resin with a perchlorate-destroying microorganism fluid product under conditions leading to conversion of perchlorate load on the resin to nonperchlorate reaction products and generation of treated ion exchange resin having reduced perchlorate load relative to the perchlorate-loaded ion exchange resin. After the perchlorate level in the resin as been reduced to a safe level, the treated ion exchange resin is disposed of.

This invention can also be embodied as part of overall processes for treating perchlorate-contaminated water. In one such process, perchlorate-contaminated feed water is obtained and then contacted with an anion exchange resin having an affinity for perchlorate thereby forming a reduced perchlorate content product water and perchlorate-loaded ion exchange resin. The perchlorate-loaded ion exchange resin and the reduced perchlorate content product water are separated and the product water is put to use as a water source for domestic, industrial or agricultural applications including use as drinking water. The perchlorate-loaded ion exchange resin is then contacted with a perchlorate-destroying microorganism fluid product under conditions leading to conversion of perchlorate load on the resin to nonperchlorate reaction products and generation of treated ion exchange resin having reduced perchlorate load relative to the perchlorate-loaded ion exchange resin. The treated ion exchange resin can then be safely disposed of or can be rinsed and returned to use treating perchlorate-contaminated feed water.

This invention can also provide a process to reduce perchlorate levels in brines. In this process the feed water is contacted with a first anion exchange resin having an affinity for perchlorate, nitrate and sulfate thereby removing perchlorate, nitrate and sulfate from the feed water and forming a reduced perchlorate, nitrate and sulfate content product water and a perchlorate, nitrate and sulfate-loaded first ion exchange resin. The product water is separated from the perchlorate, nitrate and sulfate-loaded first ion exchange resin. The perchlorate, nitrate and sulfate-loaded first ion exchange resin is contacted with brine, under conditions leading to the displacement of the perchlorate, nitrate and sulfate ions off of the resin into the brine. This yields a perchlorate, nitrate and sulfate-loaded spent brine and introduction of chloride ions onto the first ion exchange resin to yield a regenerated first resin. The perchlorate, nitrate and sulfate-contaminated spent brine and the regenerated first resin are separated and the resin can be rinsed and reused, if desired.

In this process the separated spent brine is then contacted with a second anion exchange resin having an affinity and selectivity for perchlorate. This leads to removal of the perchlorate from the spent bring and formation of a reduced perchlorate content treated spent brine and a perchlorate-loaded second ion exchange resin. This reduced perchlorate-content spent brine typically has a low enough perchlorate content to be suitably discharged into a disposal well or brine line. The perchlorate-loaded second ion exchange resin is then directly contacted with a perchlorate-destroying microorganism fluid product under conditions leading to conversion of perchlorate load on the resin to nonperchlorate reaction products and generation of treated ion exchange resin having reduced perchlorate load relative to the perchlorate-loaded ion exchange resin. This second resin can be reused in the manner just described.

In additional aspects, this invention provides equipment and systems for carrying out these methods and processes. For example the invention can be embodied as a system for treating a perchlorate-loaded ion exchange resin to reduce its perchlorate load to the point that it can be recycled and reused or to a point that it can be safely disposed of. Such a system includes a first reaction zone containing a culture comprising a perchlorate-destroying microorganism strain, an aqueous medium, and nutrient for the microorganism strain. This first reaction zone is maintained at conditions promoting the growth of the perchlorate-destroying microorganism strain. The system also includes a second reaction zone containing perchlorate-loaded anion exchange resin, means for recovering a perchlorate-destroying microorganism fluid product from the culture in the first reaction zone and means for feeding the recovered perchlorate-destroying microorganism fluid product to the second reaction zone into contact with the perchlorate-loaded anion exchange resin. This second reaction zone is operated at conditions under which the perchlorate-destroying microorganism fluid product reacts with the perchlorate load present on the perchlorate-loaded anion exchange resin and converts perchlorate to non perchlorate reaction products thereby producing a reduced perchlorate-load anion exchange resin. This system will also include either means for discarding the reduced perchlorate-load resin or means for rinsing and recovering the reduced perchlorate load resin for recycle and reuse.

Alternatively, the invention can be embodied as a system for reducing the perchlorate content of perchlorate-contaminated water. This system includes a first reaction zone containing a culture comprising a perchlorate-destroying microorganism (bacteria) strain, an aqueous substrate and nutrient for the bacterial strain. The first reaction zone is maintained at conditions promoting the growth of the perchlorate-destroying microorganism strain and includes a separator or other means for recovering a perchlorate-destroying microorganism fluid product from the culture in the first reaction zone. This system also includes a second reaction zone. This second zone or vessel contains an anion exchange resin having an affinity for perchlorate present in the perchlorate-contaminated water supply and is equipped with means for feeding the perchlorate-contaminated water to the second reaction zone into contact with the anion exchange resin under conditions permitting the resin to remove perchlorate from the perchlorate-contaminated water. This yields the desired reduced perchlorate content product water and perchlorate-loaded ion exchange resin. A suitable solid/liquid separator is provided to separate the reduced perchlorate content product water from the perchlorate-loaded ion exchange resin. Once the ion exchange resin is loaded with perchlorate it is removed from service. The perchlorate-destroying microorganism fluid product recovered from the first reaction zone is conducted into contact with the loaded resin in the second zone at conditions under which the perchlorate-destroying microorganism fluid product reacts with the perchlorate-load present on the perchlorate-loaded anion exchange resin converting perchlorate to nonperchlorate reaction products thereby producing a reduced perchlorate-load anion exchange resin. This system additionally includes means for rinsing and otherwise recovering the reduced perchlorate load anion exchange resin for reuse or disposal.

Yet additionally, the invention can also be embodied as a system for purifying water and generating a safely disposable reduced perchlorate-level salt brine side product. In this system there is a first reaction zone containing a culture comprising a perchlorate-destroying microorganism strain, an aqueous substrate, nutrient for the bacterial strain, said first reaction zone maintained at conditions promoting the growth of the perchlorate-destroying microorganism strain. The system includes means for recovering a perchlorate-destroying microorganism fluid product from the culture in the first reaction zone. There is a second reaction zone containing a first anion exchange resin having an affinity for perchlorate, nitrate and sulfate present in the perchlorate-contaminated water supply. Means are provided to feeding the contaminated water to the second reaction zone into contact with the first anion exchange resin under conditions permitting the resin to remove perchlorate, nitrate and sulfate from the contaminated water thereby forming a reduced perchlorate, nitrate and sulfate content product water and perchlorate nitrate and sulfate-loaded ion exchange resin. A separator separates the reduced perchlorate, nitrate and sulfate content product water from the perchlorate, nitrate and sulfate-loaded first ion exchange resin. The loaded first anion exchange resin formed in the second reaction zone with a salt brine under perchlorate, nitrate and sulfate displacing conditions thereby forming a perchlorate, nitrate and sulfate-loaded spent brine and a reduced perchlorate, nitrate and sulfate-content regenerated first resin and means for separating the perchlorate, nitrate and sulfate-loaded brine from the regenerated first resin. The system also includes a third reaction zone containing a second anion exchange resin having enhanced affinity for perchlorate over nitrate and sulfate and means for feeding the perchlorate, nitrate and sulfate-loaded spent brine to said third reaction zone into contact with the second anion exchange resin under conditions permitting the resin to preferentially remove perchlorate from the contaminated spent brine thereby forming a reduced perchlorate content spent brine which can be safely passed to disposal and perchlorate-loaded second ion exchange resin. The perchlorate-loaded second resin is isolated and contacted with the perchlorate-destroying microorganism fluid product recovered from the first reaction zone. This contacting is at conditions under which the perchlorate-destroying microorganism fluid product reacts with the perchlorate-load present on the perchlorate-loaded anion exchange resin converting perchlorate to nonperchlorate species and thereby producing a reduced perchlorate-load anion exchange resin. This resin may be discarded or preferably recovered and reused.

In an additional aspect this invention provides a new form of ion exchange resin particularly designed to remove perchlorate contaminant. This resin product comprises a solid, particulate, porous polymer structure carrying chemical moieties capable of associating with an anion such as chloride and capable of exchanging that anion for perchlorate. The particulate porous structure additionally has a film of perchlorate-destroying microorganisms adsorbed onto its surface.

BRIEF DESCRIPTION OF THE DRAWINGS

This invention will be further described with reference being made to the accompanying drawings in which all of the Figures are semi cross-sectional schematic elevational views of representative systems embodying this invention and in which.

DESCRIPTION OF PREFERRED EMBODIMENTS

Figure 1:
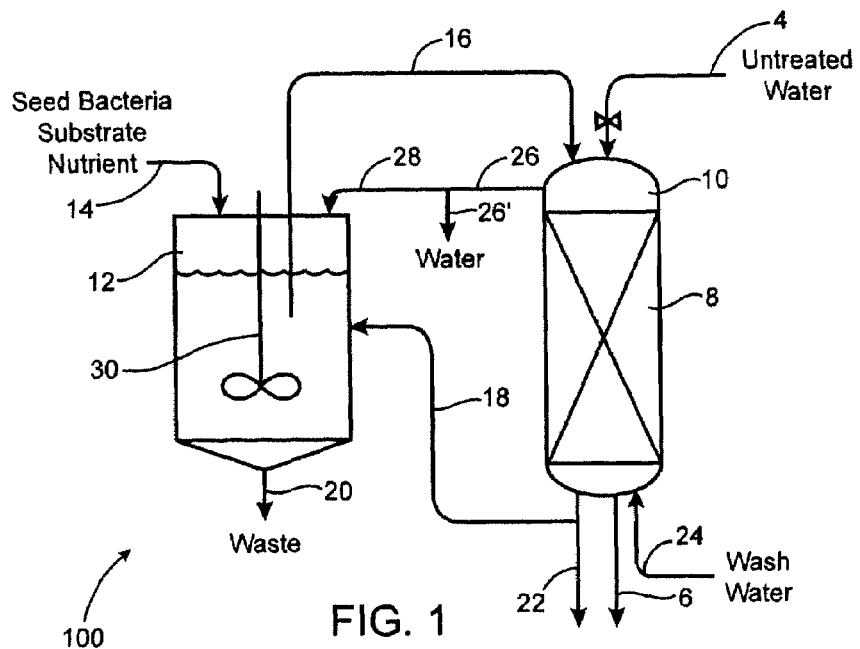
FIG. 1 shows a basic system of this invention in which the microorganism culture liquid product is a suspension of microorganisms.

The present invention relates to the use of microorganisms to break down perchlorate load on anion exchange resins. The invention is depicted in a number of different process settings with a variety of feedstocks. Accordingly, this description of preferred embodiments will be broken down into the following sections:
   The Ion Exchange Resins
   The Perchlorate-destroying Microorganisms
   The Microorganism-coated Resin Product
   Representative Feedstocks
   Overall Process Descriptions and Process Flows
   Process Conditions
   Water Treatment with Microorganisms-Coated Resin
   These sections will then be followed by Examples The Ion Exchange Resins The ion exchange resins which are loaded with perchlorate and treated in accord with the invention are generally classed as strong base resins.

These resins are based on various polymer structures such as polystyrene with cross-linkers and with appropriate active groups such as quaternary ammoniums attached. Representative resins include:
Prolate Strong Base Resins Type 1 and Type 2
Amberlite IRA-400
Amberlite IRA-900
Dowex SBR
Ionac ASB-1
Ionac AFP-100
Dowex SBR-P
Dowex 11
Duolite A-102-D
Ionac ASB-2
Amberlite IRA-93
Amberlite IR-45
Purolite A-400
Purolite A-520-E
Purolite A-600
Ionac A-260
Dowex WGR
Sybron SR6
Sybron SR7
Reillex™HPQ Resins (based on polyvinyl pyridine polymers)
Nitrex
Resintech SIR 100
Rohm and Haas Acrylic Resin Other ion exchange resins which are applicable to the invention are strong acid or weak base type resins such as:
Amberlite IR-120
Ionac C-20
Prolate C-100
Ionac C-270
Amberlite-200
Ionac CFS Generally, the strong base type I resins, particularly those based on polystyrene backbones, give good overall results removing perchlorate and are preferred.

Among these resins, excellent results have been attained using the Sybron SR6 resin. This is a resin having quaternary amine functionalities and three butyl groups in these quaternary amine groups. Sybron SR7 resin gives similarly excellent results. This is a similar quaternary amine-based resin but with three propyl groups in its quaternary amine groups. The SR7 resin has been observed to have a particularly high selectivity for perchlorate ions.

The Perchlorate-Destroying Microorganisms

This invention employs a perchlorate-reducing microorganism or, more typically, a mixture of two or more such organisms. Representative microorganism-containing compositions include the mixed bacterial cultures present in classic municipal sludge (see U.S. Pat. No. 3,755,156 (1973)); in activated sludge (see GR-1 in Rikken, G. B, et al. *Appl. Microbial. Biotechnol*. (1996) 45:420); and the BAU culture taken from Clark County, Nevada waste water treatment plants (see Gingras, T. M, et al. *J. Environ. Monit*. (2002) 4:96-101; *Wohanella succinogenes* HAP-1 of U.S. Pat. No. 5,302,285; Stan CKB from paper mill waste (see Bruce, R. A, et al. *Environ. Microbial*. (1999) 1:319); stain PPA D8 KJ KJ3 and KJ4 reported by B. E. Lodan *Appl. Environ. Microbial*. (2001) 67:2499, *Ideonella dechloratoms* and *Acinebacter thermotoleranticus*. These are merely representative of the general class of bacteria that can be used in the present process.

Additional microorganism sources include pathogen-free sludge, brewery sludge, mixed cultures and the like. In general any microorganism that can break down perchlorate can be suitable for use in this process.

These microorganisms are suitably cultured (grown out) in an aqueous medium in the presence of suitable nutrients such as sugars, lower alcohols, (e.g. methanol, ethanol, isopropanol, carbon sources and the like. The culture can be in the form of a suspension of microorganisms in the aqueous medium. The actual material that contacts the loaded resin particles is most commonly a fluid product which is defined herein to be either a suspension of the organisms in the aqueous medium or a relatively microorganism-free liquid phase separated from the suspension such as be decantation, centrifugation, filtration, screening, or the like. This latter fluid product is referred to herein as a microorganism culture "supernatant".

The Microorganism-Coated Resin Product

This invention provides a new resin product useful in the removal of perchlorate from aqueous feedstocks. It is a combination of ion exchange resin and biological materials. The material is prepared in the following steps:

1. A particulate anion exchange resin capable of exchanging chloride or the like for perchlorate is selected. Representative suitable resins are described hereinabove.
2. Perchlorate is adsorbed (exchanged) onto the resin from an aqueous solution.
3. The resin with adsorbed perchlorate is added to a bioreactor containing perchlorate-degrading microorganisms. Representative suitable microorganisms are described above.
4. The microorganisms are allowed to grow on the surface of the resin until at least a substantial fraction and preferably essentially all of the adsorbed perchlorate is consumed.
5. The resin having a thin film of microorganisms on the surface of the particles is removed from the reactor and dried at room temperature or fixed according to methods known in the art.

The product consists of ion exchange resin particles with a thin film of perchlorate-destroying microorganisms fixed to the surface of the ion exchange particles.

This new form of resin can be used to remove perchlorate from perchlorate-containing aqueous feedstreams in a single step in which the perchlorate present in the feedstream is adsorbed onto the exchange sites on the resin particles. Once there the perchlorate is converted to nonperchlorate species by the microorganisms affixed to the surface of the resin particles.

Representative Feedstocks

The resins that are treated with the perchlorate-destroying microorganism are resins which have become partially or relatively completely loaded with perchlorate ion relative to their perchlorate-adsorbing capacity. In most settings, it is desirable to remove perchlorate quite completely. Often as a resin becomes partially exhausted on an absolute scale its performance drops off slightly. This can be signal to consider to consider it "exhausted" and to remove it from service. This can occur when as few as 30 or 40% of the total available capacity has been used up. This phenomenon will be seen in the present examples where resins were deemed suitable for regeneration when about 40-45% of their total capacity was exhausted. These resins can become loaded in service in an ion exchange-based water purification unit. The term "water purification" is used in a broad sense to include the purification of not only ground water, surface run off, water found in bodies of water, streams, rivers and the like drinking water source but also to include commercial, industrial and agricultural water sources such as plant effluents, agrarian run offs, sewage and the like.

In all of these settings, the water being purified must contain an unacceptably high level of perchlorate ion. That is a level of perchlorate ion greater than a few parts per billion. This feed water can contain up to as many as many part per million of perchlorate and in some industrial settings can contain tens or even up to 100 parts per million of perchlorate. It will be appreciated that the invention would work with resins loaded by treating water with even higher perchlorate contents. In all of these settings, it is very likely, if not the rule, that there will be other anions which will be picked up by the ion exchange resin. Many of these ions such as sulfate and nitrate, while not as troublesome as perchlorate, are not particularly desirable in drinking water so their exchange onto the resin is generally welcomed. These ions are typically present at levels considerably higher, often by factors of a thousand or more, than perchlorate. A representative feed water of this type could contain from about 10 to 250 ppb of perchlorate, and 1 to 100 ppm of nitrate and/or sulfate.

Other ions such as heavy metal-based anions for example arsenate are also regularly removed from the feed water when it is contacted with the resin. Thus a loaded resin bed may be substantially loaded with perchlorate ions in some cases and in others may have secondary ions as its predominant load.

In one special setting, the feedstock streams subjected to purification by contact with the resin are themselves formed in an ion exchange process and are, for example, the rinse water and the contaminated aqueous brines generated during regeneration of ion exchange resins.

While perchlorate is one of the most readily adsorbed ions and can displace other species such as nitrate and sulfate, in practice the ion exchange resin is commonly sent to regeneration or disposal once it is loaded with perchlorate and other ions exchanged out of the feed stream.

Overall Process Descriptions and Process Flows

FIG. 1 shows a representative apparatus for contacting the resin with the microorganisms. Perchlorate-loaded resin 8 is charged to vessel 10 or is formed in vessel 10 by initially charging fresh resin to the vessel and loading it with perchlorate by passing perchlorate-laden untreated water over it via line 4. The resin will adsorb the perchlorate in exchange for a nonperchlorate ion (usually chloride) and yield perchlorate-free treated water which can be removed via line 6. This loading is exactly what happens when the resin is in service purifying water. A suspension of microorganisms; methanol, ethanol or other nutrients; suitable microorganism-growth salts and an aqueous substrate are charged to vessel 12 via line 14 and agitated to assist gas release and to prevent stratification. Once the bacteria has cultured and grown, the biomixture is fed through line 16 to vessel 10 where it reacts with the perchlorate present in resin 8. The two reactors are maintained under anaerobic conditions by use of nitrogen caps or the like. As the bacteria consumes the nutrients and perchlorate, biomass is generated that is carried off from vessel 10 via line 18 back to vessel 12 or to waste via line 22. This biomass in vessel 12 forms a sludge which is removed via line 20.

Following the reaction of perchlorate with the microorganisms, the resin can be washed, cocurrent or countercurrent, with water supplied, for example, via line 24. The biomass and microorganisms can be removed with the used wash water via line 26-26' or recycled via line 28. This washing generally removes microorganisms from the resin. Additional clean-up steps such as steaming, acid rinsing, hot water treatment and the like can be applied to the treated resin, either in place (in vessel 10) or in other process equipment not shown.

Figure 2:
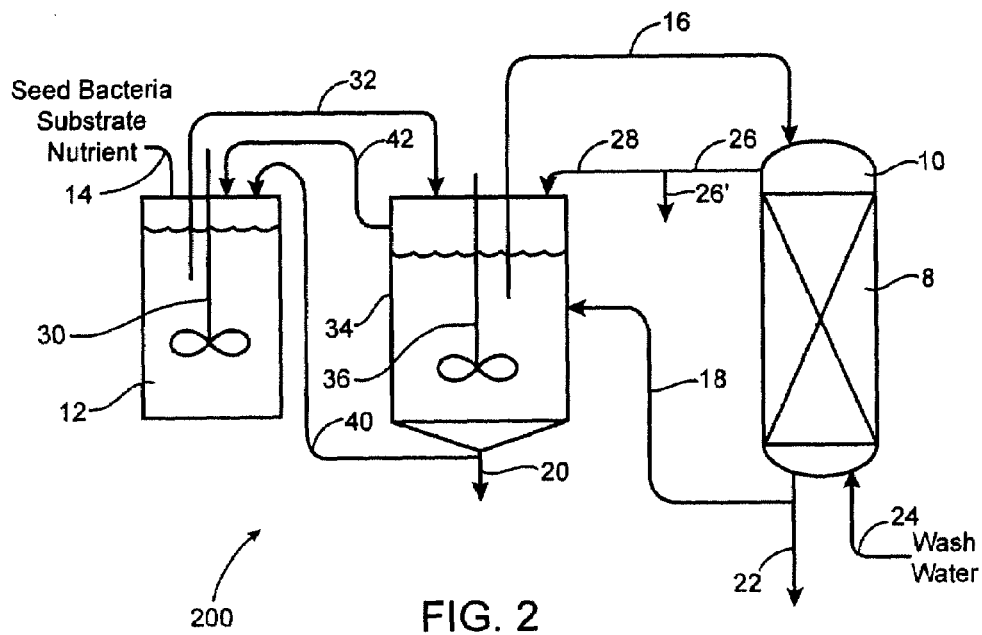
FIG. 2 shows a system in which the microorganism culture liquid product is a liquid phase separated from the suspension of microorganisms.

FIG. 2 shows a variation on the general process depicted in FIG. 1. The same numbers will be applied to the same equipment, when applicable. FIG. 2 depicts system 200 in which the perchlorate-destroying microorganisms are cultured in a two stage reactor/separator. A suspension of one or more microorganisms, methanol or other lower alcohol or sugar microorganism nutrient, suitable microorganism-growth salts and an aqueous substrate are again added via line 14 to vessel 12, equipped with agitator 30. Once the microorganism(s) are cultured and permitted to grow out, a suspension of microorganisms is passed via line 32 to separator/settler 34 which is equipped with agitator 36 to assist in the settling of the solids and achievement of a substantially solids-free supernatant microorganism culture liquid product. This solids-free liquid is drawn off and transferred via line 16 to vessel 10 which contains a bed 8 of perchlorate-loaded ion exchange resin.

System 200 provides line 18, through which the solids-free liquid can be returned to settler/separator 34 after passing over the resin bed. Overflow line 26/28 provides a route by which wash water can be taken off of the resin bed and passed to vessel 34. Sludge and other biomass can be removed from settler 34 via line 20 and optionally recycled to bioreactor 12 via line 40. Usually, at least a portion of the biomass and sludge is removed via line 20. Supernatant, separated in settler 34, can also be recycled to bioreactor 12 via line 42 for refreshment.

Figure 3:
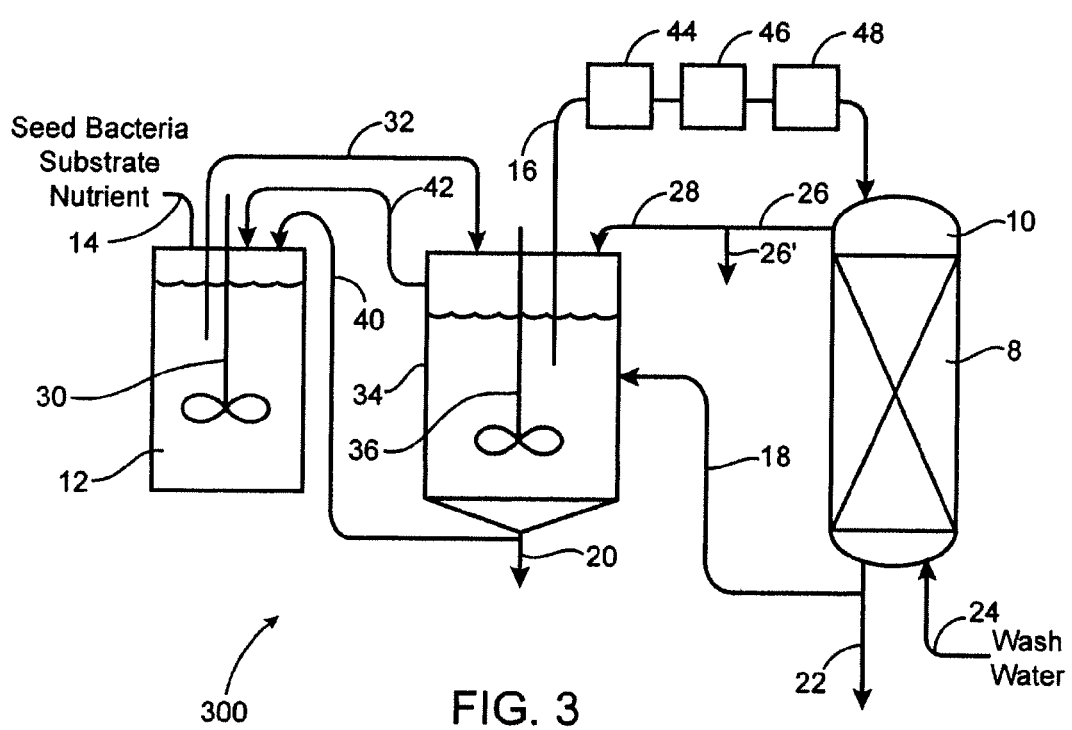
FIG. 3 shows the system of FIG. 2 with several additional features incorporated into its flow scheme.

Now turning to FIG. 3, system 300 is shown. System 300 is identical to system 200, just described, except that it includes three optional additions incorporated into line 16 to modify or treat the cultured microorganism liquid product being passed via line 16 into contact with the perchlorate-loaded resin present in bed 8. These optional additions include a filter 44.

Filter 44 is a filter designed to retain solids present in the liquid. This is nominally a 15 micron to 100 micron particle retention filter and more typically a 20 to 50 micron particle retention filter. We have used a nominal 25 micron particle retention filter in our work and find it to provide good results. Filter 44 can be used to reduce the microorganism particles as well as any particulate sludge or biomass. This may be important if the product water is to be potable water.

System 300 also optionally contains ion exchanger 46. This is an in-line ion exchanger filled with a perchlorate-selective ion exchange resin. It is generally desired to reduce the level of perchlorate on the resin in bed 8 to as low a level as possible. It is to be understood that the perchlorate ions adsorbed onto resin 8 are to a modest extent in an equilibrium with nonsorbed ions such that as liquid is flowing over the resin in bed 8, some small, but detectable, amounts of perchlorate dissociate from the resin and enter the liquid flowing past. This ion exchanger 46, with its perchlorate-selective resin, eliminates the chance that this desorbed perchlorate is readsorbed onto the resin in bed 8.

System 300 can also include a bed of activated carbon in in-line filter 48 This carbon bed can remove odors and prevent their build up it also may provide a nutritious environment for any microorganisms circulating in the liquid.

Figure 4:
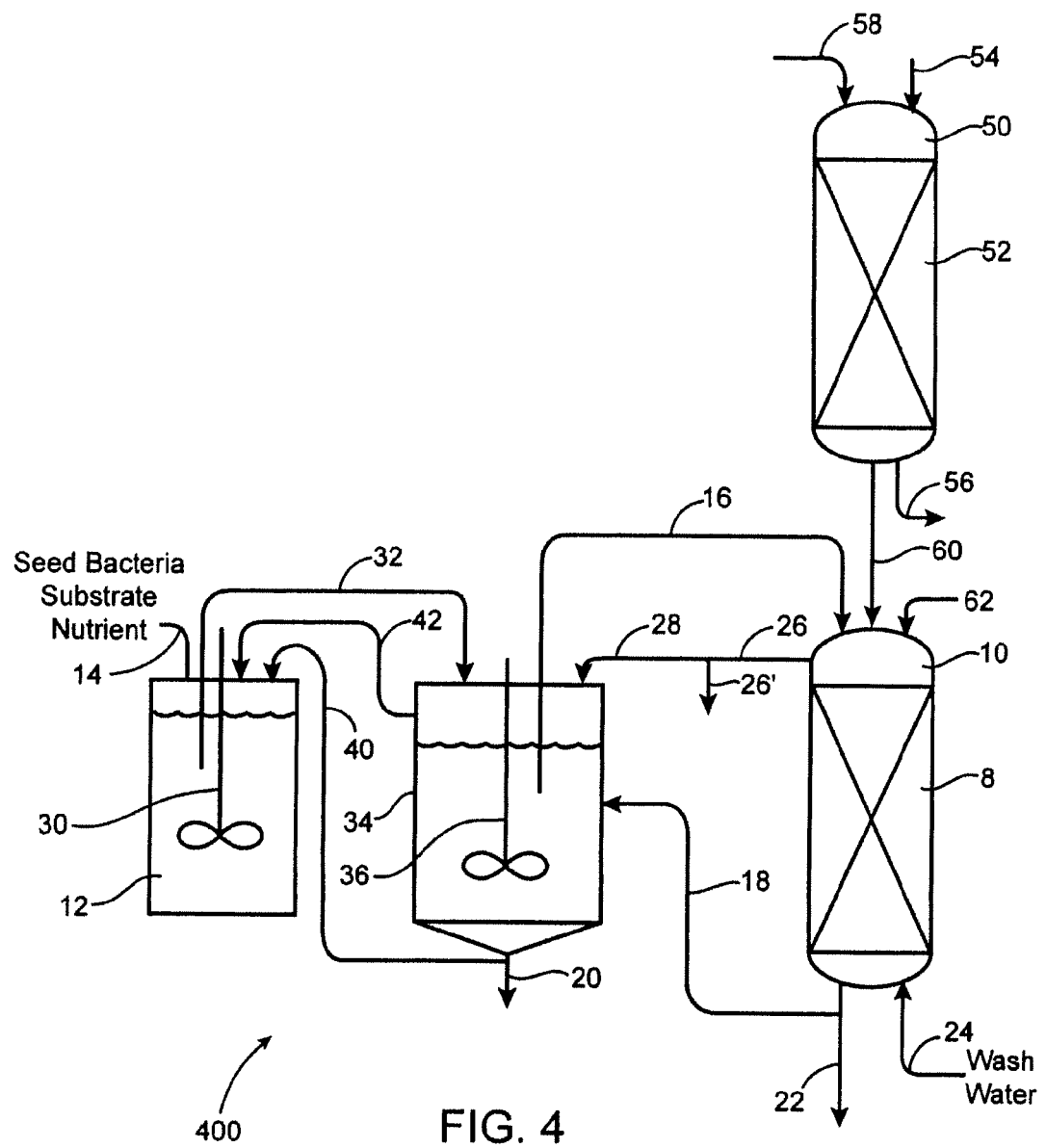
FIG. 4 shows the system of FIG. 2 adapted to treat a perchlorate-laden brine stream feed.

FIG. 4 shows system 400. System 400 resembles system 200 with one addition. It includes ion exchange vessel 50 loaded with resin bed 52. Resin bed 52 is a typical spent resin bed from use in perchlorate removal duty. Its resin contains a mixture of nitrate and sulfate ions adsorbed on its resin in addition to perchlorate. These ions would have been present in feed water fed over the resin via line 54. Product water, containing reduced levels of perchlorate, nitrate and sulfate ions is removed via line 56. To regenerate the spent resin, a brine solution, typically containing on the order of 4-8% by weight sodium chloride, is fed via line 58 and passed over resin bed 8 where it displaces the perchlorate, nitrate and sulfate ions present on the spent resin. The effluent brine from vessel 50, which contains perchlorate, nitrate and sulfate ions, is transferred via line 60 to vessel 10 which contains a perchlorate-selective resin as bed 8. This resin bed adsorbs the perchlorate onto the resin in bed 8 and yields a relatively perchlorate-free but nitrate and sulfate-rich effluent out of vessel 10. This effluent is removed via line 22, most typically for discard/disposal into a commercial brine disposal line or well. This is advantageous in that the untreated brine stream with its substantial perchlorate concentration can not be fed into typical commercial brine disposal lines and wells.

Once the resin bed 8 is loaded with perchlorate, the flow of brine is stopped, rinse water is passed over the resin via line 62 to removal via line 22. This removal of brine is often needed to prevent the high salt level from deactivating the microorganisms which are next fed over the resin bed 8. Once the bed 8 has been rinsed, microorganism culture liquid product is fed via line 16 from separator 34 and the process described with reference to FIG. 2 is carried out to permit the perchlorate load on the resin in bed 8 to be reacted to nonperchlorate products.

In the process depicted with reference to system 400, it will be noted that perchlorate was separated from nitrate and sulfate by desorbing and eluting all of the three ions simultaneously off of resin bed 52 with brine. Thereafter resin selectivity was relied upon to preferentially adsorb the perchlorate content from the brine. In a variation on this, the three ions can be adsorbed onto the resin bed 8 in vessel 10 from a perchlorate, nitrate and sulfate-contaminated water source substantially as depicted in FIG. 2. The perchlorate can be digested, using the microorganism culture liquid product and thereafter, once the perchlorate level has been suitably reduced to a level that any residual perchlorate will not be a disposal issue, the bed of resin 8 in reactor 10 which will then still contain substantial levels of nitrate and sulfate can be treated with brine to desorb the nitrate and sulfate and minor amounts of perchlorate, remaining on the resin. The loaded brine, so formed, will have minimal perchlorate content and can be discarded by routine channels.

Process Conditions

Contacting the resin with the microorganisms is carried out in batch or continuous mode. The amount of microorganism suspension should be enough to completely immerse the resin particles. The concentration of microorganisms in the suspension will be in part determined by the organism itself and is typically defined by the equilibrium concentration which the organism achieves as it is grown.

Contacting is carried out for a prolonged period of time, such as at least about 1 or 2 days and up to 2-3 or even 4-5 weeks. The extent of conversion can be monitored and conversion of essentially all the perchlorate contamination can be achieved. The contacting can be conducted at any temperature at which the microorganisms retain viability, such as from about 5° C. to about 50° C. and especially from 15° C. to about 40° C.

The influent water should not contain large amounts of dissolved oxygen to maintain an anaerobic condition in which the microorganisms can flourish and degrade perchlorate. From time to time, backwashing will remove any excess microorganism build up from the column.

While the process can, in theory be carried out in a static mode, better results are generally achieved when the microorganism fluid product is flowed over the perchlorate-loaded resin. Representative flow rates are from about 0.1 volumes of flow per volume of resin per hour to about 10 volumes per volume per hour.

Ion Exchange Water Treatment with Microorganism-Coated Resin

A microorganism-coated ion exchange resin as described above can be used in water treatment to remove perchlorate from a drinking water supply. The coated resin material is placed in a column as in the usual column configuration used in an ion exchange process. The untreated water is fed into the top of the column (with a small amount of organic nutrient material such as ethanol) where it is contacted with the microorganism-coated ion exchange material. The perchlorate is adsorbed onto and concentrated by the resin. The perchlorate-degrading bacteria breaks down the perchlorate on the resin as the microorganism expands and as the perchlorate is adsorbed.

The present invention will be further described by the following examples. These are provided solely to illustrate the practice of this invention and are not to be construed as limitations on its scope:

EXAMPLE 1

Bench Scale Tests

The following is a description of bench scale tests that show perchlorate can be degraded while it is adsorbed on an ion exchange resin.

Anaerobic digestion was demonstrated to be very efficient in degrading perchlorate that has been adsorbed onto A520E resin. The resin was saturated with a perchlorate solution. A sample of conventional sewage sludge was obtained and grown up under anaerobic conditions with added lower alcohol nutrient in an aqueous medium. A sample of this suspension of microorganisms was placed in a bioreactor. The saturated resin sample was placed in a pair of perforated holders to allow the suspension of microorganisms to contact the resin. The reactor was purged with nitrogen and maintained under anaerobic conditions. The suspension and the loaded resin were allowed to remain in contact for two weeks.

One of the two samples of the resin was removed from the reactor after a period of two weeks and bacterial sludge was removed by rinsing with water. About 10 ml of rinsed, bio-treated resin was placed in a flask with 400 ml of perchlorate solution (initial concentration was 1,291 mg/l). After 24 hrs of mixing in a shaker, the concentration of perchlorate decreased to 410 mg/l. This result indicated that about 40% of ion-exchange capacity was recovered by two weeks of incubation in the anaerobic digester.

These values were calculated as follows:

1. The amount of $ClO_4$ removed by bio-treated resin $=(1291 \text{ mg/l}-410 \text{ mg/l})\times0.41$ $=352.4 \text{ mg}$ 2. Ion-exchange (perchlorate) capacity of bio-treated resin $=352.4 \text{ mg}/10 \text{ ml}$ $=35.24 \text{ mg/ml}$ of resin $=0.354 \text{ meq/ml}$ of resin 3. Minimum ion-exchange (perchlorate) capacity of virgin A520E resin $=0.9 \text{ meq/ml}$ 4. The efficiency of bio-treatment (bio-regeneration) during 2 weeks of incubation in the anaerobic digester $=0.354/0.9$ $=39.3\%$ The second resin sample was allowed to remain in the digester for an additional two weeks. Its capacity for perchlorate adsorption was then measured. It was found that a greater percentage of the resin capacity was restored by four weeks of treatment in the digester but that only up to about 50% regeneration was attained. Although not understood with certainty, one explanation for this limited regeneration is that at static conditions some kind of boundary layer is built up around the resin. (This is possibly a protective microfilm of some sort or ionic concentration gradient. The resin does not pick up organics). This boundary layer grew thick enough to slow down the bioreduction reaction.

EXAMPLE 2

Effect of Agitation and Flow Systems

As shown in Example 1, at zero flow rate or very low rates only about 40% of the perchlorate can be removed regardless of time (days) in the reactor. However, with agitation or with a high flow rate, such as flow system space velocities of from about 0.1 to about 10 v/(v×hrs)Vv 100% regeneration can be achieved using a suspension of microorganisms in times as short as about 3 days.

EXAMPLE 3

Comparison of Use of Slurry and Supernatant Fluid Microorganism Products

In order to investigate the effect of pre-sedimentation on the bio-regeneration efficiency, two ion exchange columns loaded with perchlorate-loaded A-520-E resin were connected to the bio-regeneration systems, with and without pre-sedimentation. The presedimentation zone was as set forth in FIG. 2. A sewage sludge source of microorganisms as used in Example 1 was used. One column (A) was fed supernatant produced in a sedimentation basin (working volume 2.6 L) which was placed between the bioreactor and Column A. Pickets, which rotated at 0.6-0.7 rpm, were installed to prevent the bridging of sludge particles and to accelerate the release of biogas. The second column, Column B was fed anaerobic sludge. Due to the high concentration of suspended solids (SS), it was not easy to pump anaerobic sludge to Column B continuously. So, Column B flow to was operated intermittently (10 to 20 min per day) Column B could be described as a "zero" flow rate column. The averaged flow rate of Column A was 11.4 ml/min.

Water samples were taken every day from 3 sampling ports, the influent and effluent of Column A and the influent of Column B. Resin samples were taken out every day from each of the columns and isotherm adsorption tests were conducted for the measurement of ion-exchange capacity of the bio-treated resins. This test was conducted for 5 days of operation.

The efficiency of bio-regeneration as a function of elapsed time was measured. For the calculation of bio-regeneration efficiency, the averaged perchlorate-exchange capacity of virgin A520E resin (1.12 meq/ml) was used Since the resin, which was packed into the columns, was only partially exhausted (44.6%) by the perchlorate adsorption, the bio-regeneration efficiency should be compared to this portion. Column A (presedimentation) showed bioregeneration levels of from 38.9-47.7% with most measurements reflecting 44% or better (based on the capacity of virgin resin or about 85-100% based on the fraction of sites adsorbing perchlorate. Column B (no presedimentation) showed bioregeneration to levels of from 33.7% to 43.5% (based on the capacity of virgin resin or about 75-95% based on the fraction of sites adsorbing perchlorate. It is clear that Column A had consistently higher bio-regeneration efficiency than Column B. This result means that the supernatant can be advantageously used as a bio-regenerating agent.

EXAMPLE 4

Application to Brine Treatment

The removal of perchlorate from a resin as described above can be applied to a resin loaded with perchlorate from a brine that is itself generated in a resin regeneration process as follows.

Ground water containing about 20 ppb of perchlorate and part per million levels of nitrate and sulfate can be treated with an acrylic resin. Approximately 500 bed-volumes of water can be treated. The resin is regenerated by contact with a strong salt brine (6-8% w NaCl). This desorbs the perchlorate, nitrate and sulfate off of the resin. The concentration of perchlorate in the brine will be about 10 mg/L. Such a brine with this much perchlorate cannot be disposed of because of regulatory requirements. The brine, however, can be treated with a perchlorate specific resin, such as A520E resin which preferentially adsorbs the perchlorate but also will typically pick up some nitrate and/or sulfate. When the perchlorate is transferred to the A520E resin, the concentration of perchlorate in the waste brine will be below detection levels and the treated brine is acceptable for disposal. The concentration of perchlorate on the A520E resin will be about 300 mg/L.

The perchlorate-loaded A520E resin can then be treated in a static or flow system with a suspension of perchlorate-destroying microorganisms or a supernatant from such a microorganism culture to remove the perchlorate as is described above. This resin can then be recycled to treat more brine with the sodium chloride in the brine displacing any excess nitrate or sulfate and preventing the resin from becoming saturated with sulfate and nitrate which primarily remain in the brine for disposal.

What is claimed is:

1. A system for reducing the perchlorate load on a perchlorate-loaded anion exchange resin and producing a reduced perchlorate load anion exchange resin comprising:
    a source of perchlorate-destroying microorganism fluid product,
    a resin contact reaction zone containing perchlorate-loaded anion exchange resin and in which the perchlorate-loaded anion exchange resin is directly contacted with the perchlorate-destroying microorganism fluid product provided by the source at conditions under which the perchlorate-destroying microorganism fluid product reacts with the perchlorate load present on the perchlorate-loaded anion exchange resin converting perchlorate to nonperchlorate reaction products thereby producing a reduced perchlorate load anion exchange resin, and
    a separator for separating the reduced perchlorate load anion exchange resin from the perchlorate-destroying microorganism fluid product.

2. The system of claim 1 additionally including a source of rinse water to rinse the reduced perchlorate load anion exchange resin.

3. The system of claim 1 wherein the source of perchlorate-destroying microorganism fluid product comprises a microorganism-containing reaction zone containing a culture comprising a perchlorate-destroying microorganism strain, an aqueous medium, nutrient for the microorganism strain, said first reaction zone maintained at conditions promoting the growth of the perchlorate-destroying microorganism strain.

4. The system of claim 3 wherein the source of perchlorate-destroying microorganism fluid product additionally includes a separator for recovering perchlorate-destroying microorganism fluid product from the culture in the microorganism-containing reaction zone.

5. The system of claim 4 wherein the source of perchlorate-destroying microorganism fluid product additionally includes a fluid deliverer for feeding the recovered perchlorate-destroying microorganism fluid product to the resin contact reaction zone into direct contact with the perchlorate-loaded anion exchange resin.

6. The system of claim 3 additionally comprising a resin recoverer for recovering the rinsed reduced perchlorate load anion exchange resin from the resin contact reaction zone.

7. The system of claim 6 wherein the conditions under which the perchlorate-destroying microorganism fluid product reacts with the perchlorate load present on the perchlorate-loaded anion exchange resin include flow contact of the fluid product with the perchlorate-loaded anion exchange resin.

8. The system of claim 1 wherein the nonperchlorate reaction products comprise at least one of least one of chloride, hypochlorite and chlorite.

9. A system for reducing the perchlorate content of perchlorate-contaminated water comprising:
    a source of perchlorate-contaminated water,
    a reaction zone containing an anion exchange resin having an affinity for perchlorate present in the perchlorate-contaminated water,
    a fluid feeder for feeding the perchlorate-contaminated water to the reaction zone into contact with the anion exchange resin under conditions permitting the resin to remove perchlorate from the perchlorate-contaminated water thereby forming a reduced perchlorate content product water and perchlorate-loaded anion exchange resin, a separator for separating the reduced perchlorate content product water from the perchlorate-loaded anion exchange resin, a source of perchlorate-destroying microorganism fluid product, a contactor for directly contacting the perchlorate-loaded anion exchange resin formed in the reaction zone with the perchlorate-destroying microorganism fluid product at conditions under which the perchlorate-destroying microorganism fluid product reacts with the perchlorate-load present on the perchlorate-loaded anion exchange resin converting perchlorate to non perchlorate reaction products thereby producing a reduced perchlorate-load anion exchange resin, and a separator for separating recovering the reduced perchlorate load anion exchange resin from the perchlorate-destroying fluid reaction product.

10. The system of claim 9 additionally including a source of rinse water to rinse the reduced perchlorate load anion exchange resin.

11. The system of claim 9 wherein the source of perchlorate-destroying microorganism fluid product comprises a microorganism-containing reaction zone containing a culture comprising a perchlorate-destroying microorganism strain, an aqueous medium, nutrient for the microorganism strain, said first reaction zone maintained at conditions promoting the growth of the perchlorate-destroying microorganism strain.

12. The system of claim 11 wherein the source of perchlorate-destroying microorganism fluid product additionally includes a separator for recovering perchlorate-destroying microorganism fluid product from the culture in the microorganism-containing reaction zone.

13. The system of claim 12 wherein the source of perchlorate-destroying microorganism fluid product additionally includes a fluid deliverer for feeding the recovered perchlorate-destroying microorganism fluid product to the resin contact zone into direct contact with the perchlorate-loaded anion exchange resin.

14. The system of claim 11 additionally comprising a resin recoverer for recovering the rinsed reduced perchlorate load anion exchange resin from the resin contact zone.

15. The system of claim 14 wherein the conditions under which the perchlorate-destroying microorganism fluid product reacts with the perchlorate load present on the perchlorate-loaded anion exchange resin include flow contact of the fluid product with the perchlorate-loaded anion exchange resin.

16. The system of claim 9 wherein the nonperchlorate reaction products comprise at least one of least one of chloride, hypochlorite and chlorite.

17. The system of claim 9 wherein the resin contact zone is the reaction zone.

18. The system of claim 9 wherein the resin contact zone is separate from the reaction zone.

19. A system for reducing the perchlorate content of perchlorate-contaminated water that additionally contains at least one of nitrate and sulfate comprising a source of nitrate and/or sulfate-containing, perchlorate-contaminated water, a first reaction zone containing a first anion exchange resin having an affinity for perchlorate and nitrate and/or sulfate present in the perchlorate-contaminated water, a fluid feeder for feeding said nitrate and/or sulfate-containing perchlorate-contaminated water to the first reaction zone into contact with the first anion exchange resin under conditions permitting the resin to remove perchlorate and nitrate and/or sulfate from the perchlorate-contaminated water thereby forming a reduced perchlorate, nitrate and sulfate-content product water and perchlorate, nitrate and sulfate-loaded first anion exchange resin, a separator for separating the reduced perchlorate, nitrate and sulfate-content product water from the perchlorate, nitrate and sulfate-loaded first anion exchange resin, a salt brine source providing a salt brine in contact with the separated perchlorate, nitrate and sulfate-loaded first anion exchange resin under nitrate, sulfate, and perchlorate displacing conditions thereby forming a nitrate, sulfate and perchlorate-loaded spent brine, and a reduced nitrate, sulfate and perchlorate-content regenerated first anion exchange resin, a separator for separating the nitrate, sulfate and perchlorate-loaded spent brine from the regenerated first anion exchange resin, a second reaction zone containing a second anion exchange resin having enhanced affinity for perchlorate over nitrate and sulfate, a fluid feeder for feeding the nitrate, sulfate and perchlorate-loaded spent brine to the second reaction zone into contact with the second anion exchange resin under conditions permitting the resin to preferentially remove perchlorate from the nitrate, sulfate and perchlorate-loaded spent brine thereby forming a reduced perchlorate content spent brine and perchlorate-loaded second anion exchange resin, a separator for separating the reduced perchlorate-loaded spent brine from the perchlorate-loaded second anion exchange resin, a source of perchlorate-destroying microorganism fluid product, a contactor for directly contacting the perchlorate-loaded second anion exchange resin formed in the second reaction zone with the perchlorate-destroying microorganism fluid product at conditions under which the perchlorate-destroying microorganism fluid product reacts with the perchlorate-load present on the perchlorate-loaded second anion exchange resin converting perchlorate to nonperchlorate reaction products thereby producing a reduced perchlorate-load second anion exchange resin, and a separator for separating recovering the reduced perchlorate load second anion exchange resin from the perchlorate-destroying fluid reaction product.

20. The system of claim 19 additionally including a source of rinse water to rinse the reduced perchlorate load anion exchange resin.

21. The system of claim 19 wherein the source of perchlorate-destroying microorganism fluid product comprises a microorganism-containing reaction zone containing a culture comprising a perchlorate-destroying microorganism strain, an aqueous medium, nutrient for the microorganism strain, said first reaction zone maintained at conditions promoting the growth of the perchlorate-destroying microorganism strain.

22. The system of claim 21 wherein the source of perchlorate-destroying microorganism fluid product additionally includes a separator for recovering perchlorate-destroying microorganism fluid product from the culture in the microorganism-containing reaction zone.

23. The system of claim 22 wherein the source of perchlorate-destroying microorganism fluid product additionally includes a fluid deliverer for feeding the recovered perchlorate-destroying microorganism fluid product to the resin contact reaction zone into direct contact with the perchlorate-loaded anion exchange resin.

24. The system of claim 21 additionally comprising a resin recoverer for recovering the rinsed reduced perchlorate load anion exchange resin from the resin contact reaction zone.

25. The system of claim 24 wherein the conditions under which the perchlorate-destroying microorganism fluid product reacts with the perchlorate load present on the perchlorate-loaded anion exchange resin include flow contact of the fluid product with the perchlorate-loaded anion exchange resin.

26. The system of claim 19 wherein the nonperchlorate reaction products comprise at least one of least one of chloride, hypochlorite and chlorite.

* * * * *